United States Patent

Buhrer

[15] 3,688,282
[45] Aug. 29, 1972

[54] MAGNETO-OPTICAL MAGNETIC FIELD POLARITY SENSOR
[72] Inventor: Carl F. Buhrer, Oyster Bay, N.Y.
[73] Assignee: General Telephone & Electronics Laboratories Incorporated
[22] Filed: Oct. 16, 1970
[21] Appl. No.: 81,387

[52] U.S. Cl. ...340/174 TF, 340/174 CB, 340/174 M, 340/174 YC
[51] Int. Cl............................G11c 11/14, G11c 11/42
[58] Field of Search...................340/174 TF, 174 YC

[56] References Cited

UNITED STATES PATENTS 3,475,738  10/1969  Louis et al...........340/174 YC

OTHER PUBLICATIONS

Journal of Applied Physics; Vol. 29, No. 3, March 1958, pgs. 390–391

*Primary Examiner*—James W. Moffitt
*Attorney*—Irving M. Kriegsman

[57] ABSTRACT

Apparatus for sensing the polarity of a low strength magnetic field located within a region having small spatial dimensions. A transparent magnetically uncompensated transducer consisting of a bismuth-containing iron garnet is placed within the magnetic field. The transducer is characterized by a large Faraday effect, low coercive force and a demagnetizing field which is small in comparison with the magnetic field being sensed. The axis of polarization of a linearly polarized beam of light transmitted through the transducer is rotated as a result of interaction with the magnetic field in a direction determined by the polarity of the field. Means are provided for determining the direction of rotation of the axis of polarization thereby sensing the polarity of the magnetic field.

8 Claims, 4 Drawing Figures

INVENTOR.
CARL F. BUHRER

BY

R. J. Frank
ATTORNEY.

INVENTOR.
CARL F. BUHRER 3,688,282

MAGNETO-OPTICAL MAGNETIC FIELD POLARITY SENSOR

BACKGROUND OF THE INVENTION

This invention relates to devices for sensing magnetic fields and in particular to apparatus for determining the polarity of a low strength magnetic field located within a region having relatively small spatial dimensions.

There are instances in which it is necessary to sense the polarity of low strength magnetic fields having small spatial dimensions. Such fields, in addition to having low magnetization, may also be in close proximity to one or more surrounding magnetic fields which tend to interfere with detection of the polarity of the field of interest. For example, memory arrays are known in which single-wall magnetic domains are selectively situated within thin sheets of magnetic crystals. The magnetized sheet outside of the domains has a first polarity normal to the sheet whereas the magnetic field within the domains is of opposite polarity. The domains are often less than 25 microns in diameter and may be spaced from adjacent domains by as little as 25 microns. The presence or absence of a domain at a given location may be used to signify whether a binary "1" or "0" has been stored at that location.

It is possible to determine whether or not a domain exists at a given location in a sheet by transmitting a small diameter linearly polarized light beam through the sheet and observing the direction which the axis of polarization is rotated. If a domain is absent, the Faraday rotation of the axis of polarization will be in a first direction whereas if a domain is present the axis of polarization will rotate in the opposite direction corresponding to the opposite polarity of the magnetic field at the domain location. However, the Faraday rotation due to the magneto-optic effect within the sheet is often too small to provide a reliable reading.

Alternatively, one may sense the magnetic field outside the sheet in the region of interest. Implementation of the apparatus requires a transducer having an active cross-sectional area less than the area of a domain, a relatively large Faraday rotation, low coercive force and a demagnetizing field which is small in comparison with the magnetic field being sensed. My invention relates to apparatus for determining the polarity of low strength magnetic fields of restricted volume which employs such a transducer.

SUMMARY OF THE INVENTION

In accordance with the invention, the apparatus provided for sensing the polarity of magnetic fields comprises a transparent magnetically uncompensated transducer consisting of a bismuth-containing iron garnet positioned within the magnetic field. Means are provided for generating a linearly polarized beam of electromagnetic energy having a cross-sectional area less than that of the magnetic field and for transmitting the beam through the transducer. The bismuth-containing iron garnet transducer has a large Faraday rotation, and therefore the axis of polarization of the beam is rotated through a correspondingly large angle enabling the direction of rotation to be determined by a polarization analyzer optically coupled to the transducer.

The transducer is formed from a magnetically uncompensated crystal of the general formula $Bi_{3-2x} Ca_{2x} Fe_{5-x} V_x O_{12}$ where $0.8 < x < 1.4$, with the restriction that values of $x$ which would result in a magnetically compensated crystal are excluded. Compensated crystal compositions are avoided because they exhibit a large coercive magnetic field which would reduce the sensitivity of the transducer in detecting polarity reversals in small magnetic fields. With x in the 0.8 to 1.4 range, the Faraday rotation of the crystal is approximately 11,000 degrees per centimeter for a beam of light having a wavelength of 6,328 Angstroms. Also, for compositions near but not at the compensation point, the crystal has low coercivity such that its magnetization will switch polarity in applied fields as small as twenty oersteds. In addition, the demagnetizing field of the transducer is low compared to the applied fields of this magnitude.

If a transducer of the defined composition is placed in a region in which the field polarity is to be determined, it will magnetize in a direction parallel to the field. The magnetization direction can then be determined by passing a narrow beam of plane polarized light, such as from a helium-neon laser, through the crystal. The light passing through the transducer crystal will have its axis of polarization rotated in a direction determined by the relative directions of the applied magnetic field and the light beam propagation. The sense of rotation of the axis of polarization is determined by the polarization analyzer located in the path of the beam emerging from the transducer.

In a typical embodiment of the invention the surface of a ferrimagnetic sheet capable of supporting magnetic domains is divided into a plurality of small finite locations, each location being characterized by the presence or absence of a magnetic domain. A transducer is positioned on the surface of the sheet adjacent each of these locations. If a domain is present at a given location on the sheet, the transducer will be situated within its fringing magnetic field. Consequently, a beam of plane polarized light transmitted through the transducer will have its polarization axis rotated in a first direction. If no domain is present at the location, the polarization axis will be rotated in the opposite direction.

BRIEF DESCRIPTION OF THE DRAWINGS

FIG. 1b is similar to FIG. 1a except that a single transducer layer is shown in place of the individual transducers of FIG. 1a.

DESCRIPTION OF THE PREFERRED EMBODIMENT

Figure 1A:
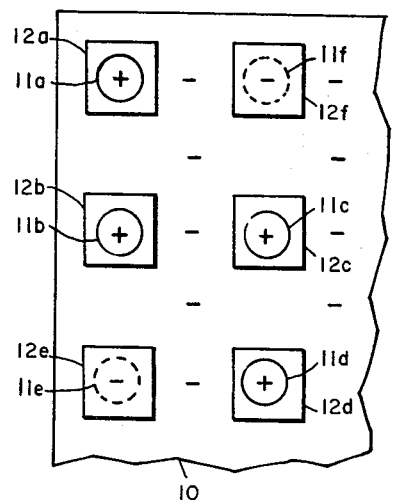
FIG. 1a is a schematic illustration of a sheet of material including single wall magnetic domains and individual transducers for detecting the polarity of the magnetic field at predetermined locations.

Referring to FIG. 1a, there is shown schematically a section of an oriented single-crystal sheet 10 comprised of a ferrimagnetic material such as terbium orthoferrite. This material is capable of supporting cylindrical magnetic domains which are represented in FIG. 1a by circles 11a – 11d. (Dashed circles are shown at 11e and 11f to indicate positions where domains could be located but are actually not present.) The sheet 10 is substantially isotropic in the plane of the sheet and has a preferred magnetization direction normal thereto. It shall be assumed that sheet 10 is magnetized in a direction into the plane of the paper as viewed in FIG. 1 and this magnetization direction has been represented by minus signs.

The cylindrical magnetic domains 11a – 11d are localized highly stable magnetic states which can be moved about at extremely high speeds and packed within sheet 10 at densities exceeding $10^4$ per square inch. The domains are magnetized in a direction opposite to that of the sheet, normal to and out of the plane of the paper, as represented in FIG. 1a by plus signs. Additional information on magnetic domains may be obtained from the article "Application of Orthoferrites to Domain-Wall Devices," Bobeck et al., IEEE Transactions on Magnetics, Vol. MAG–5, No. 3, September 1969.

Figure 1B:
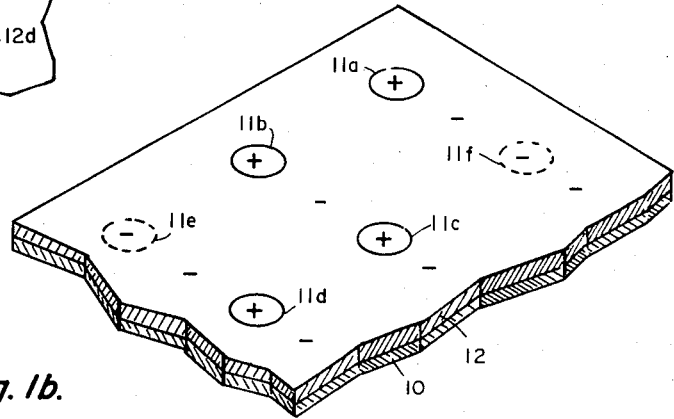

When a ferrimagnetic sheet is used as a memory device, the presence or absence of a domain at a given location is a measure of the binary information stored at that position on the sheet. Since the domains are small (often less than 25 microns in diameter), they must be sensed with a transducer of comparable size and high positional accuracy. Transducers 12a – 12f comprise thin square crystals which are affixed to the surface of sheet 10 at locations where binary information is stored. As illustrated in FIG. 1a, transducers 12a – 12d are placed at locations coinciding with the presence of magnetic domains 11a – 11d and transducers 12e and 12f are situated at locations on sheet 10 where domains are absent. Alternatively, transducers 12a –12f may be replaced with a single continuous layer 12 affixed to sheet 10 as shown in FIG. 1b.

Transducers 12a – 12f (or sheet 12) are composed of bismuth-containing iron garnet crystals having the general composition where $x$ is chosen to have a value between 0.8 to 1.4 which excludes the compensation point. At the compensation point, the magnetization of the material is essentially zero and the material exhibits an undesirably large coercive field. For values of $x$ above the compensation point, the Faraday rotation is positive and for values of $x$ below this point the rotation is negative. The magnitude of the Faraday rotation near the compensation point exceeds 10,000 degrees per centimeter of transducer thickness for plane polarized light having a wavelength of 6,328 Angstroms. This magnitude increases as $x$ decreases to and beyond the compensated composition. For $Bi_{3-2x}Ca_{2x}Fe_{5-x}V_x O_{12}$, compensation is obtained for $x$ about equal to 1.0 although, in a given sample, a slightly different value of $x$ may produce a compensated composition. When $x$ is chosen close to the compensation point (e.g., 1.01 for a composition having compensation point at $x = 1.00$), it is possible to have a crystal with a Faraday rotation of approximately 11,000 degrees per centimeter at 6,328 Angstroms, a demagnetizing field which is small compared to the field being sensed and a low coercive force. In general, the demagnetizing field and coercivity of the transducers are small enough so that the magnetization of the transducer will switch from one polarity to the other in an applied field as small as 20 oersteds.

Figure 2:
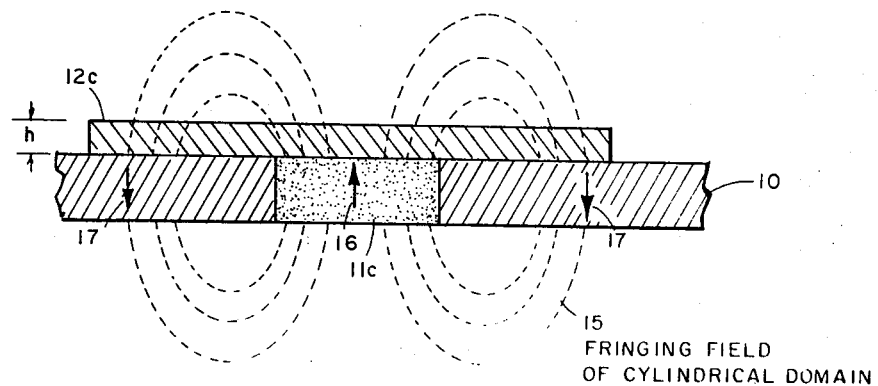
FIG. 2 illustrates the fringing magnetic field produced by the presence of a magnetic domain within the sheet of FIG. 1.

FIG. 2 illustrates schematically the fringing magnetic field 15 produced above and below sheet 10 by one of the domains, say 11c. This fringing field extends into the region occupied by transducer 12c, the transducer becoming magnetized in the direction of the field as indicated by arrow 16 corresponding to the plus sign of FIG. 1a. The portions of sheet 10 between domains is magnetized in the opposite direction from the domain 11c as indicated by arrow 17 and the minus signs of FIG. 1a.

Figure 3:
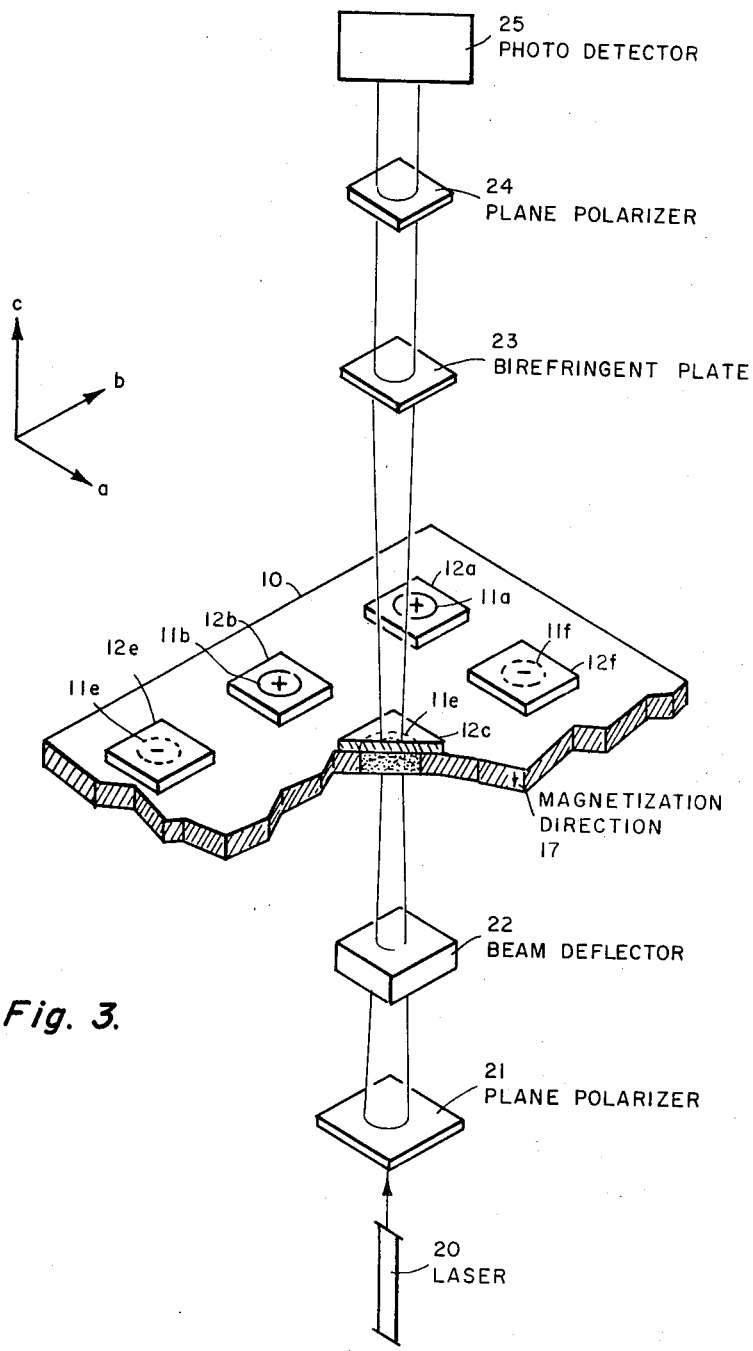
FIG. 3 is a schematic diagram of apparatus for use in conjunction with the transducers of FIG. 1.

Apparatus for sensing the presence of a magnetic domain at a specific location in a ferrimagnetic sheet 10 is shown in the schematic representation of FIG. 3 in which sheet 10 of FIG. 1a has been sectioned at domain 11c and transducer 12c. The magnetization in sheet 10 is along the $+c$ crystallographic axis in the domain and opposite elsewhere. Thus, the magnetization direction in the transducers 12a – 12f and therefore the polarity of the magneto-optic effect will be determined by the presence or absence of a domain at a given location on sheet 10.

In order to determine whether a domain is present at a given location on the sheet, a beam from a laser 20 is transmitted through a plane polarizer 21 and light beam deflector 22 to a selected location on sheet 10. Laser 20 is a conventional heliumneon device having a principal output at 6,328 Angstroms and beam deflector 22 may be of any conventional design for steering the laser beam to a desired location on sheet 10. Plane polarizer 21 polarizes the beam from laser 20 with its axis of polarization along the $a$ or $b$ axis to minimize polarization due to any linear birefringence in the terbium orthoferrite sheet 10. If, as indicated in FIG. 3, the beam is directed at sheet 10 at the site of domain 11c, the beam will be transmitted through that domain and transducer 12c. Transducer 12c is within the fringing magnetic field of domain 11c and therefore the axis of polarization of the beam is rotated as it passes through the transducer. In addition to being rotated, the beam becomes slightly elliptically polarized due to combination of the Faraday rotation and circular dichroism present in the bismuth containing iron garnet forming transducer 12c.

The beam emerging from transducer 12c impinges upon a quarter-wave birefringent plate 23 and then passes through a plane polarizer 24 to a photodetector 25. The combination of the birefringent plate 23 and plane polarizer 24 functions as an elliptical polarization analyzer. In one mode of operation, birefringent plate 23 and plane polarizer 24 are individually rotated to extinguish the light reaching photodetector 23 for the sense of rotation corresponding to the absence of a domain at the read-out site. Transducers 12e and 12f would produce such a rotation since no domain is present at their locations. When a domain, such as 11c, is present at a location being interrogated with the plane polarized laser beam, the rotation and dichroism of the transducer above the domain are of a sense opposite that present when a domain is absent and a certain fraction of the intensity of the incident beam reaches photodetector 23. Alternatively, the polarization analyzer may be adjusted to block light to the photodetector when a domain is present and permit it to reach that detector when a domain is absent.

The success of the magneto-optic read-out system of FIG. 3 depends to a large extent on the fraction of light passed to photodetector 23 when the elliptical polarization analyzer is transmitting to indicate the presence (or absence) of a domain. The ratio of the light (I) reaching detector 25 to the light $I_0$ impinging on the beam deflector 21 is a function of the Faraday rotation, the circular dichroism and the absorption coefficient of the transducer as well as the absorption which takes place in the orthoferrite crystal sheet 10, the input plane polarizer 21 and beam deflector 22. Neglecting the loss components in sheet 10, plane polarizer 21 and deflector 22, which will be present regardless of what magneto-optic active element is used as a transducer, it is found that for transducer thicknesses $h$ between 40 and 80 microns, a ratio of $I/I_0$ between 0.1 and 0.2 may be obtained with bismuth calcium iron vanadium garnet transducers. It has been found that much smaller ratios of $I/I_0$ are obtained with other transducer materials under comparable conditions, particularly when the interrogating laser beam is in the 6,000 to 12,000 Angstroms region.

What is claimed is:

1. A memory device comprising
  a. a sheet of ferrimagnetic material capable of supporting magnetic domains, said sheet being divided into a plurality of small finite locations, each location being characterized by the presence of a magnetic domain having a fringing magnetic field associated therewith or by the absence of such domain, and
  b. a transparent magnetically uncompensated transducer layer comprising a bismuth-containing iron garnet having the formula $Bi_{3-2x}Ca_{2x}Fe_{5-x}V_xO_{12}$ where $0.8 < x < 1.4$, values of $x$ resulting in a magnetically compensated crystal being excluded, said transducer layer being positioned on the surface of said sheet adjacent each of said finite locations respectively, the portions of said layer located adjacent said locations containing magnetic domains being within the fringing magnetic field associated therewith.

2. A magneto-optical device defined by claim 1 wherein said transducer layer is divided into a plurality of individual transducers, each of said transducers being located adjacent one of the plurality of finite locations in said sheet of ferrimagnetic material characterized by the presence or absence of a magnetic domain.

3. Apparatus for sensing the polarity of a magnetic field comprising
  a. a transparent magnetically uncompensated transducer comprising a bismuth-containing iron garnet positioned within said magnetic field, said bismuth-containing iron garnet having the formula $Bi_{3-2x}Ca_{2x}Fe_{5-x}V_xO_{12}$ where $0.8 < x < 1.4$, values of $x$ resulting in a magnetically compensated crystal being excluded, said transducer being characterized by an active cross-sectional area corresponding to that of the magnetic field whose polarity is to be sensed, a relatively large Faraday rotation, low coercive force and a demagnetizing field which is small in comparison with the magnetic field being sensed,
  b. means for generating a linearly polarized beam of electromagnetic energy having a cross-sectional area less than that of said magnetic field, said beam being transmitted through said transducer thereby having its axis of polarization rotated in a direction determined by the polarity of said magnetic field, and
  c. means optically coupled to said transducer for determining the direction of rotation of said beam of electromagnetic energy.
  d. means optically coupled to said transducer layer for determining the direction of rotation of the axis of polarization of said beam of light.

4. Apparatus for sensing the presence of a magnetic domain having a fringing field at a given location within a sheet of ferrimagnetic material capable of supporting magnetic domains, said apparatus comprising
  a. a transparent magnetically uncompensated transducer comprising a bismuth-containing iron garnet positioned on the surface of said sheet at said given location within the fringing magnetic field of said domain, said bismuth-containing iron garnet having the formula $Bi_{3-2x}Ca_{2x}Fe_{5-x}V_xO_{12}$ where $0.8 < x < 1.4$, values of x resulting in a magnetically compensated crystal being excluded,
  b. means for generating a linearly polarized beam of light having a cross-sectional area less than that of said magnetic domain, said beam being transmitted through said transducer thereby having its axis of polarization rotated in a direction determined by the magnetization polarity of said domain, and
  c. means optically coupled to said transducer for determining the direction of rotation of the axis of polarization of said beam of light.

5. Apparatus as defined by claim 4 wherein said means for generating a linearly polarized beam of light comprises a laser and plane polarizing means positioned in the path of the beam emitted by said laser.

6. Apparatus as defined by claim 4 wherein said means for determining the direction of rotation of the axis of polarization of said beam comprises an elliptical polarization analyzer and a photodetector, the amount of light reaching said photodetector being determined by the angular orientation of said elliptical polarization analyzer.

7. A magneto-optical device comprising
  a. a sheet of ferrimagnetic material capable of supporting magnetic domains, said sheet being divided into a plurality of small finite locations, said sheet of ferrimagnetic material comprising Tb-FeO$_3$, each location being characterized by the presence of a magnetic domain having a fringing magnetic field associated therewith or by the absence of such domain,
  b. a transparent magnetically uncompensated transducer layer positioned on the surface of said sheet adjacent each of said finite locations respectively, said transducer layer comprising bismuth-containing iron garnet having the formula $Bi_{3-2x}Ca_{2x}Fe_{5-x}V_xO_{12}$ where $0.8 < x < 1.4$, values of $x$ resulting in a magnetically compensated crystal being excluded, the portions of said layer located adjacent said locations containing magnetic domains being within the fringing magnetic field associated therewith, c. means for generating a linearly polarized beam of light having a cross-sectional area less than that of said finite location and directing said beam to a selected area of said transducer layer, the axis of polarization of said beam being rotated as it passes through said transducer area in a direction determined by the presence or absence of a magnetic domain adjacent said selected transducer area, and d. means optically coupled to said transducer layer for determining the direction of rotation of the axis of polarization of said beam of light.

8. A magneto-optical device as defined by claim 7 wherein said transducer layer is divided into a plurality of individual transducers, each of said transducers being located adjacent one of the plurality of finite locations in said sheet of ferrimagnetic material characterized by the presence or absence of magnetic domain.

* * * * *